July 27, 1943.  M. C. TATE  2,325,345
WEIGHING SYSTEM
Filed Feb. 5, 1940  5 Sheets-Sheet 1

INVENTOR
MALCOLM C. TATE
BY
*Edward L. Hathaway*
ATTORNEY

Fig. 3

INVENTOR
MALCOLM C. TATE
BY
ATTORNEY

Fig. 4

July 27, 1943. M. C. TATE 2,325,345
WEIGHING SYSTEM
Filed Feb. 5, 1940 5 Sheets-Sheet 4

INVENTOR
MALCOLM C. TATE
BY
ATTORNEY

July 27, 1943.  M. C. TATE  2,325,345
WEIGHING SYSTEM
Filed Feb. 5, 1940   5 Sheets-Sheet 5

INVENTOR
MALCOLM C. TATE
BY
ATTORNEY

Patented July 27, 1943

2,325,345

UNITED STATES PATENT OFFICE 2,325,345

WEIGHING SYSTEM

Malcolm C. Tate, Stamford, Conn., assignor to The Baldwin Locomotive Works, a corporation of Pennsylvania Application February 5, 1940, Serial No. 317,286

28 Claims. (Cl. 265—47)

This invention relates generally to apparatus for measuring and/or indicating certain conditions to which the apparatus is responsive and relates more particularly to a load weighing and indicating apparatus and system for materials testing machines.

While my invention is illustrated herein as being specifically applicable to weighing hydraulic forces such as are utilized in various types of hydraulically operated materials testing machines, yet it will be understood that various features and principles of operation can be utilized to measure, indicate and/or control certain conditions such as load, temperature, etc. created in various manners. However, in the field of materials testing machines a great many problems are peculiar thereto because a materials testing machine is fundamentally a scientific precision instrument having the peculiar requirement that notwithstanding its scientific precision qualities still it must be a rugged piece of machinery adapted to withstand tremendous forces. Also the forces to be measured vary through a wide range and yet it is most essential that the apparatus be just as sensitive, accurate and responsive in the low load ranges as in the higher load ranges.

It is an object of my invention to provide an improved load weighing apparatus that is rugged for equipment of its class and yet is flexible in its manipulation and accomplishes the several precision qualities of sensitivity, accuracy and responsiveness in a simple, positive and direct manner.

A further object is to provide an improved air controlled load weighing apparatus which in one specific aspect of the invention is accomplished by an improved simplified air jet and baffle system employing a relatively large constant pressure orifice in cooperation with a large size jet opening thereby obtaining a very high degree of sensitivity, accuracy and responsiveness without the need of any interposed devices for magnifying the pressure changes occurring in the air system.

A further object is to provide an improved multiple load range weighing and indicating system adapted to be changed in a simple and direct manner from one load range to another without any possibility of damage to the apparatus or of interruption to the progress of a test thereby permitting a testing operation to be made with maximum dispatch together with retaining the several precision qualities heretofore mentioned.

A further object is to provide an improved multiple load weighing and indicating system whereby the zero point for each load range may be accurately and expeditiously established prior to starting a test.

A further object is to provide improved means for transmitting a load measurement from the weighing apparatus to an external source such as a recorder or any other desired instrument. A more specific object in this respect is to provide improved means for changing the magnification of the measurement to be transmitted.

Other objects are to provide an improved arrangement for maintaining the weighing and operating forces preferably in axial alignment to avoid introduction of bending moments or other disturbing factors into the weighing system; to provide an improved arrangement for damping vibrations which might occur in the Bourdon tubes or the control mechanism but at the same time avoid introduction of friction or other unnecessary extraneous retarding forces; to provide an improved arrangement for preventing overstressing of the low range Bourdon tube but without interfering with the action of the high range Bourdon tube although insuring adequate protection of the high range tube against sudden release of large load pressures such as occur upon rupture of a specimen; to provide an improved air control and also spring operation of a servomotor whereby the servo-motor has a desired extent of stroke in response to a minimum pressure change in the Bourdon tube; and to provide a multiple load weighing and indicating system that is relatively economical in construction, operation and maintenance and is accessible for inspection as well as being foolproof so that a comparatively inexperienced person cannot only safely operate the machine but also obtain the full advantages of the precision qualities and flexible manipulation and versatility of the apparatus.

Other objects and advantages will be more apparent to those skilled in the art from the following description of the accompanying drawings in which.

Figure 1:
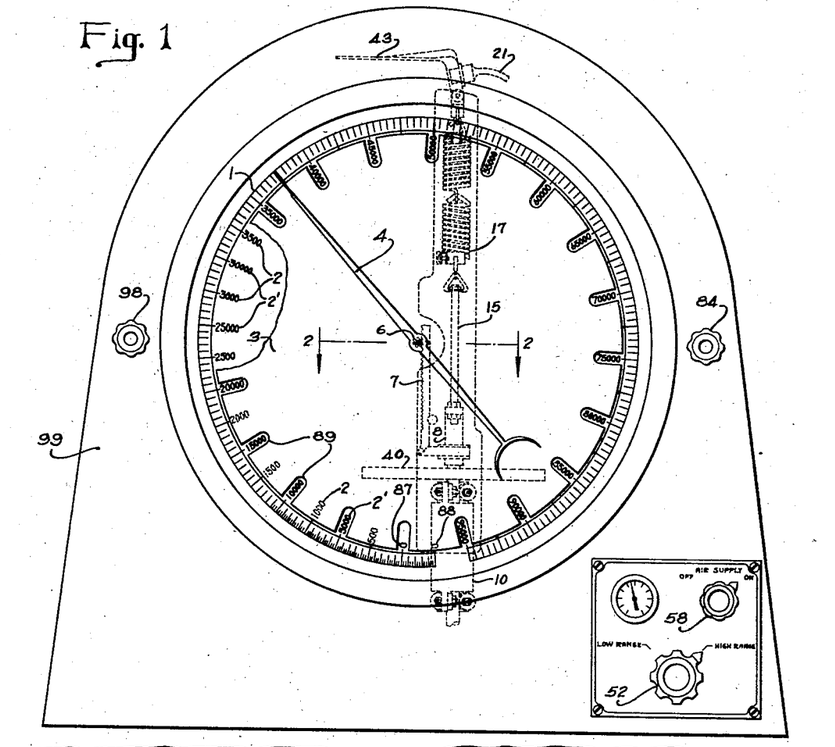
Fig. 1 is a front elevation of a load indicating dial forming a part of my improved combination.
Figure 2:
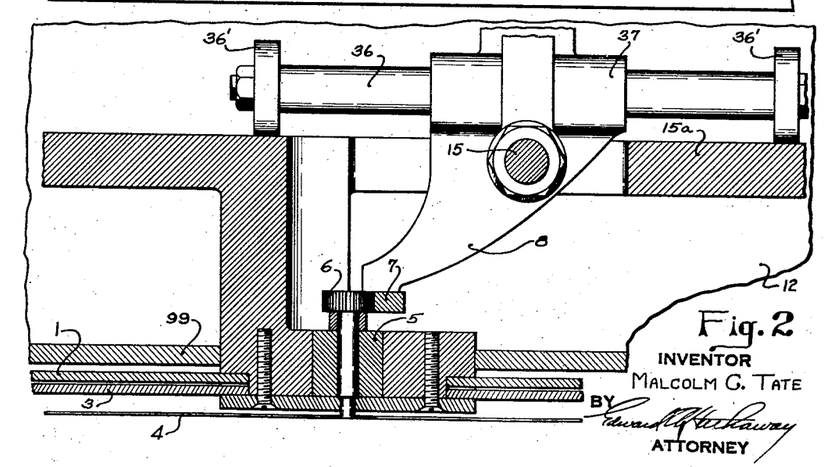
Fig. 2 is a transverse sectional view taken substantially on the line 2—2 of Fig. 1.

In the particular embodiment of the invention such as is disclosed herein merely for the purpose of illustrating one specific form among possible others that the invention might take in practice, I employ certain fundamental elements constituting the subject matter of my Patent No. 2,212,085, filed January 27, 1936. However, because certain of these elements are involved in a new cooperative relation in the combination constituting the present invention the same will be fully described herein. As shown in Fig. 1, the dial 1 has two sets of load graduations 2 and 2' adapted to be rendered selectively visible through a slotted mask 3 coaxially disposed in superimposed relation to the dial. A load indicating pointer 4 is suitably journalled in a bearing 5, Fig. 2, and is provided at its rear end with a pinion 6, Fig. 9, to be operated by a vertically movable rack 7 pivotally secured at its lower end to a vertically movable crosshead 8, Fig. 3. A rod 9, Fig. 6, extends downwardly through a vertical stationary bearing bracket 10 for connection to an air controlled servo-motor 11 specifically in the form of a bellows whose lower end is secured to a suitable stationary base 12, Fig. 3, and whose upper end is movable vertically to actuate rod 9 and crosshead 8. The support 10 has at each of its upper and lower ends sets of three roller bearings generally indicated at 13 for guiding rod 9 with minimum friction. A pair of bolts 14, Fig. 6, rigidly hold bearing bracket 10 to a stationary back plate 15a of the dial structure.

Figure 3:
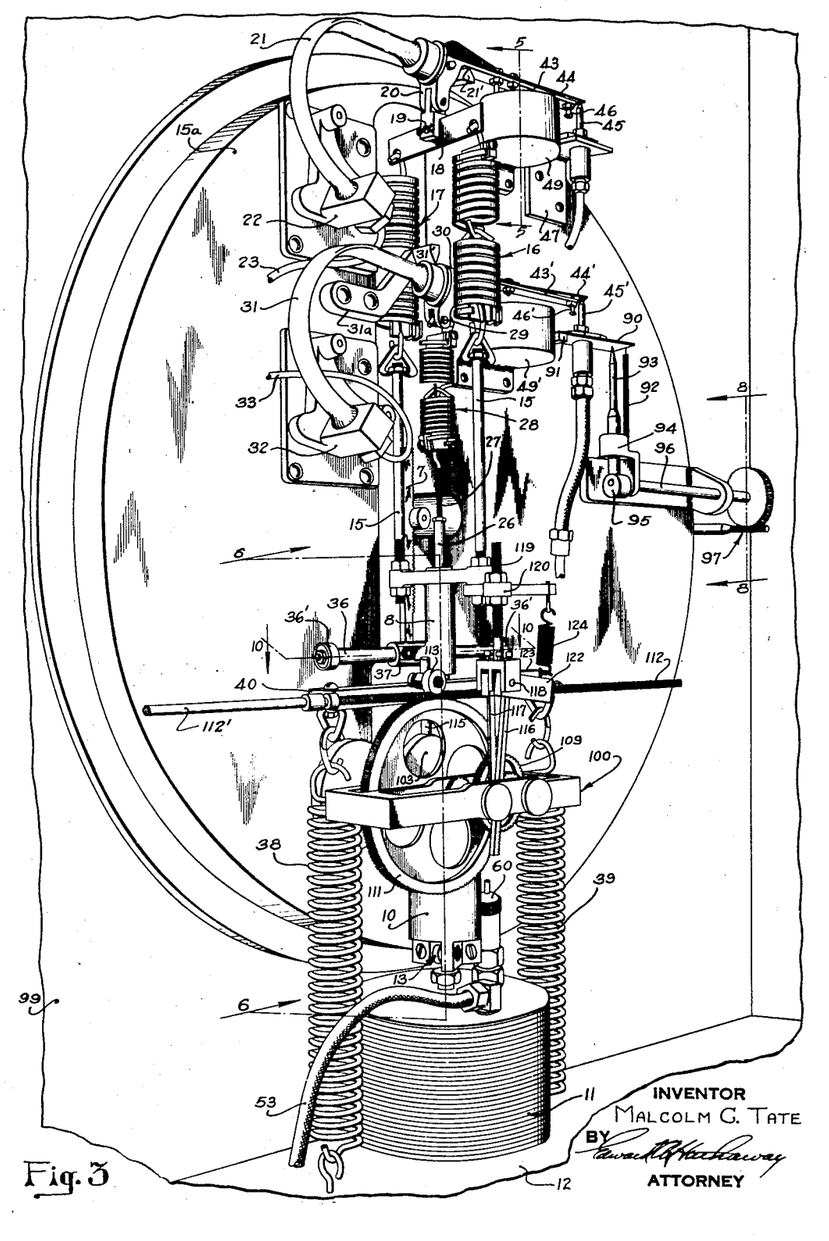
Fig. 3 is a perspective of the rear side of the dial mechanism showing the multiple load range weighing apparatus.
Figure 5:
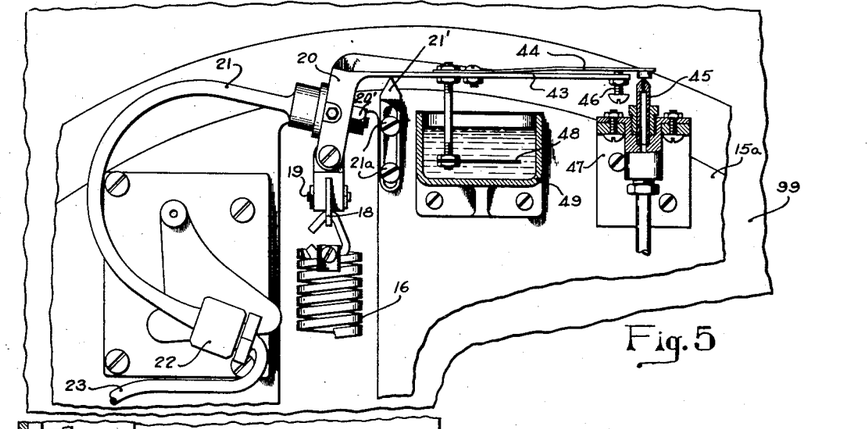
Fig. 5 is an enlarged view of the high load range Bourdon tube and the jet-baffle therefor together with a section of the baffle dampener taken substantially on the line 5—5 of Fig. 3.

The crosshead 8, Fig. 3, is also connected through a pair of side rods 15 to a set of springs generally indicated at 16 and 17 whose upper ends are connected to a cross bar 18 pivotally supported as at 19 to a suitable bracket 20 which is clamped by a bolt and nut 20', Fig. 5, to the free closed end of a high load range Bourdon tube 21. The fixed end of this Bourdon tube is suitably secured in a bracket 22 secured to backing plate 15a while a pipe 23 is connected to a source of hydraulic pressure of a materials testing machine such as the main hydraulic loading cylinder or to the "hydraulic support" of an Emery type machine shown, for example, in Patent 1,848,468 or to any other desired source of pressure.

The crosshead 8 is further connected, Fig. 3, through a rod 26 rigidly secured to the crosshead and through an adjustably threaded stem 27, to a low load range set of springs generally indicated at 28. The upper ends of this set of springs are pivotally connected as at 29 to a closure bracket 30 of a low load range Bourdon tube 31. The fixed end of this Bourdon tube is secured to the backing plate 15a through a bracket 32 and is connected by a pipe 33 to the same pressure source as pipe 23, preferably by a common connection. The closure brackets 20 and 30 are identical and also the sets of springs are of the isoelastic type having a straight line stress-strain relation although the set of springs 28 is of smaller capacity than the springs 16, 17 so as to produce the desired ratio between the two load ranges.

To provide a simple and effective arrangement for preventing rotation of crosshead 8, two rods 36 are individually rotatably adjustably mounted in a laterally offset boss 37 formed integrally with crosshead 8. The two outer ends of these rods have eccentric portions 36a, Fig. 10, upon which is mounted a pair of roller bearings 36' adapted to have rolling engagement with the rear surface of backing plate 15a. These rods may be adjustably rotated to establish said surface guiding contact through the action of the eccentric portions 36a and after the adjustment is made suitable set screws in boss 37 may firmly hold the rods in position. The individual adjustability of the rods 36 gives greater latitude of adjustment than if only one continuous rod were used.

Figures 8, 9, 10, 11:
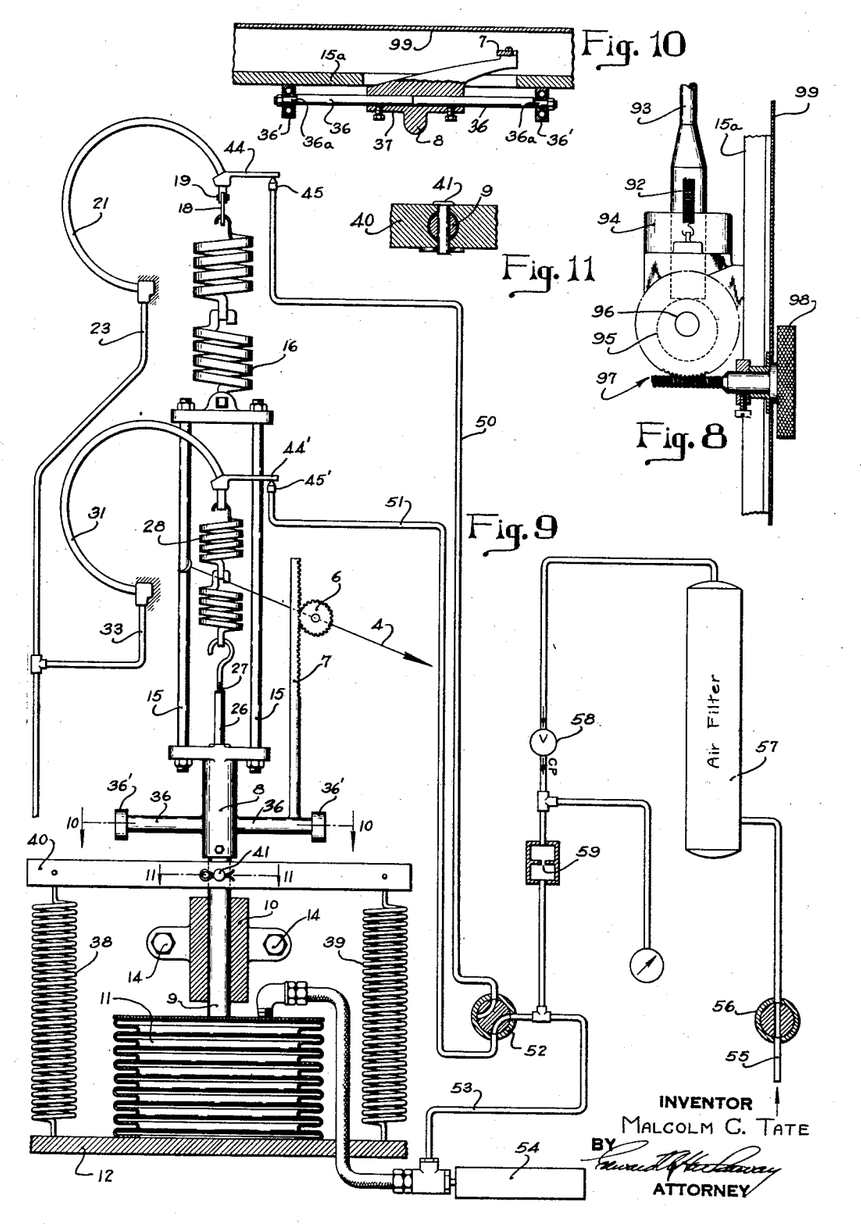
Fig. 8 is an enlarged transverse section taken on the line 8—8 of Fig. 3.
Fig. 9 is a diagrammatic outline of certain load weighting elements employed in my improved combination.
Fig. 10 is a horizontal section taken substantially on the line 10—10 of Figs. 3 and 9.
Fig. 11 is a sectional view taken on a plane corresponding to line 11—11 of Fig. 9.

As shown in Figs. 3 and 9 a pair of servo-motor springs 38 and 39 of substantial length are secured at their lower ends to frame 12 and at their upper ends to a cross bar 40 which as diagrammatically shown in Figs. 9 and 11 is pivotally connected at 41 to the servo-motor rod 9. The pivotal connection 41 insures uniform equalization of the action of springs 38 and 39 and a similar equalization is obtained for the load weighing springs 16 and 17 through the pivotal equalizing arm 18.

*Servo-motor control means.*—Each of the Bourdon tubes has an air jet and baffle associated therewith and hence the description of one will suffice for both, corresponding reference numbers being used for similar elements except that the numbers for the low load range elements will be primed. As shown in Fig. 5, the Bourdon tube bracket 20 has an elongated inflexible arm 43 carrying a flexible baffle plate 44 which is rigidly secured at its inner end to arm 43 while its outer end overlies an air jet 45. A screw 46 carried by arm 43 is adapted to adjust the vertical position of baffle plate 44. The jet 45 is rigidly supported in a suitable bracket 47 secured to the backing plate 15a. Also secured to arm 43 is a damping plate 48 disposed in a stationary oil chamber 49 mounted on backing plate 15a. A novel characteristic of damping plate 48 is that it does not act as a dashpot but instead merely obtains its damping action by virtue of the inertia of the damping liquid, it being noted that the plate 48 is widely spaced from the walls of container 49. This provides a very stable action for the baffle 44 without influencing the accuracy, sensitivity or responsiveness of the weighing operation.

The air jets 45 and 45' are respectively connected, Fig. 9, through a pair of pipes 50 and 51 to a load range shifting valve 52 adapted to selectively connect said pipes to the servo-motor 11 as by a pipe 53. An air reservoir 54 is in continuous communication with pipe 53 thereby insuring smooth operation of the bellows 11. Air is supplied from any suitable source under a pressure of upwards of 30 or 40 pounds through a pipe 55 and valve 56 to a suitable air filter 57 and thence through a valve 58 for reducing the pressure to a constant value of say 25 pounds per square inch on the outlet side which communicates with a control orifice 59 and thence with both the servo-motor and the selected jet. It will be noted that the air jets, orifices 59 and servo-motor are all connected together in a simple and direct manner without any interposed operating elements. Said direct connection is continuous at all times for a given load range, that is, so long as that range is operative. During operation of one range, the other range is inoperative.

Heretofore a relay valve was interposed in the air circuit so as to give a step-up of sensitivity. The openings in the jets and orifices of this prior arrangement were relatively small whereas my present improved combination obtains not only a high degree of sensitivity but does so with relatively large openings in the jet and orifice 59. This feature, aided by the fact that the servo-motor permits sufficient stroke with a practically constant acting area, produces a combination wherein the servo-motor gives the desired stroke with minimum change in jet pressure (or baffle motion). This means that the jet-baffle distance will change very little between zero load and full load which, in actual operation, is only about .002 of an inch. This has several advantages: (a) the jet-orifice servo-motor combination is made very sensitive. Minute changes in pressure in the Bourdon tube will tend to produce baffle displacements which are much larger than are actually necessary to initiate movement of the servo-motor, or stated otherwise, a very small baffle motion is required to operate the servo-motor and, therefore, the servo-motor will respond to very minute pressure changes in the Bourdon tube. (b) If the jet-orifice-servo-motor combination is highly sensitive as above pointed out, it means that an instantaneous pressure change in the tube of a given magnitude (producing instantaneous baffle motion) will tend to produce quick balancing of the system. (c) If the jet-servo-motor combination is highly sensitive as above pointed out, an external friction force (which might disturb the action of the servo-motor) will produce less disturbance in the stroke of the servo-motor (such as dial indication). In other words, the indicator or other external mechanism operated by the servo-motor will be better able to overcome outside friction without having it produce any noticeable effect on the indicator.

*Operation of jet—Baffle control.*—Assuming that it is desired to operate within the low load range, the changeover valve 52, Fig. 9, is placed in the position as shown. Air pressure is admitted from a suitable source through pipe 55 whereupon it flows through the constant pressure valve 58 and thence through orifice 59 to jet 45' and to servo-motor 11. Assuming that load is now applied to the testing machine, the Bourdon tube 31 will expand thereby raising baffle 44' minutely away from jet 45' to allow a greater rate of discharge of air through the jet. This results in a decrease of pressure in pipes 51, 53 and servo-motor 11. The springs 38 and 39 which are initially under tension hold down the cross-arm 40 so as to move crosshead 8 and rod 26 downwardly thereby pulling down the set of springs 28 to restore baffle 44' substantially to its original relation to jet 45'. The baffle 44' is not moved to precisely its initial position but to a point where the pressure in pipe 51 will not be further reduced and hence a balanced relation is obtained between the downward force exerted by servo-motor springs 38 and 39 and the combined upward forces of the fluid acting in the servo-motor 11 and in the Bourdon tube 31. During this operation the servo-motor 11 has a relatively large increment of movement compared to a relatively small minute increment of movement of baffle 44', this being accomplished by reason of the elasticity of spring 28. The relatively large movement of the servo-motor and crosshead 8 in turn transmit a corresponding degree of movement to rack 7 and pinion 6 thereby rotating the load indicating pointer 4.

Upon a decrease of load Bourdon tube 31 will contract thereby causing baffle 44' to move toward jet 45' to restrict discharge of air from the jet. This increases the pressure in pipes 51, 53 and in the servo-motor 11 thereby moving the servo-motor and crosshead 8 upwardly so as to reduce the tension on springs 28 whereupon baffle 44' will move very slightly away from the jet 45' to establish a balance between the downward force of servo-motor springs 38 and 39 and the combined forces of the pressure acting upwardly in the servo-motor and in the Bourdon tube 31. Of course, it will be understood that the foregoing increase or decrease of load in Bourdon tube 31 may be continuously varied without interruption as during testing of a specimen and hence the foregoing balancing of forces will be a continuous operation, although where a test is maintained in a static condition the foregoing balanced forces will reach a corresponding static condition.

As described in my Patent No. 2,212,085, filed January 27, 1936, the Bourdon tubes are preferably prestressed either hydraulically as by usual pre-loading springs for a hydraulic support in a materials testing machine or by an initial mechanical stressing of the tubes brought about by having the tubes, when in an unstressed and unloaded condition, initially expanded beyond their normal control position. Hence, when the tubes are assembled with the servo-motor mechanism the springs 38, 39 thereof will mechanically pull the free end of the tube and accordingly contract the same and stress its walls. Upon admission of air to the system the servo-motor will move upwardly sufficiently only to bring the system into a balanced condition. The tubes however will retain sufficient prestressing so as to aid in the sensitivity of the system.

To change the load range capacity of the weighing apparatus, it is only necessary to rotate valve 52 in a clockwise direction so as to connect jet pipe 50 with orifice 59 and the servo-motor 11. The operation of jet 45 and baffle 44 will then be identical to the mode of operation described for the low load range Bourdon tube and the associated jet baffle therefor as heretofore described. The balanced relation between the jet 45 and baffle 44 is maintained by a smaller amount of movement of servo-motor 11 than is the case for the low load range jet-baffle 44', 45'. This smaller movement can be brought about by the fact that springs 16 and 17 are stiffer than springs 28 or, as is preferred, the acting area of tube 21 and the stiffness of springs 16 and 17 are designed so that servo-motor 11 will move the load indicating hand a proportionately smaller distance than would be the case if the same degree of load change occurred in the low range operation. Hence, for a given load change in the high load range, servo-motor 11 will move the load indicating hand a proportionately smaller distance than would be the case if that same degree of load change occurred in the low load range operation. The high load range Bourdon tube 21 is subjected to the same prestressing as above described for Bourdon tube 31.

The low load range tube 31 is limited in its expanding movement by a stop 31' supported on backing plate 15a by a bracket 31a and engageable with the outer free end of the tube when the pressure is above the normal range of the tube. The stop 31' has the function of converting the tube from a cantilever beam to a two point supported beam which reduces the maximum bending moment and the stresses in the tube when inoperative. The high load range tube 21 is provided with an inverted stop 21' engageable, Fig. 5, with the under side of Bourdon tube arm 43 and is vertically adjustably supported by screws 21a on the backing plate 15a. A stop identical in structure and purpose to 21' is also provided for Bourdon tube 31. The function of stop 21' is that upon occurrence of a sudden release of pressure on a tube in use, the hydraulic resultant force acting on the tube decreases suddenly. However, the load of the iso-elastic springs 16, 17 or 28 continues so that the tube tip is pulled downwardly. This downward motion might be enough to tilt the baffle 44 so that it would not cover the jet 45 effectually. That is, the baffle 44 might be canted diagonally across the jet opening whereas it is desired to have the baffle extend horizontally across the jet. In fact, if the baffle is canted it would hinder and perhaps prevent the indication of the lower load values of this particular range. Hence, the stop 21' is set just below the normal operating position of the tube. If the tube now moves downward, it can only go down a very small distance, but sufficient to firmly close the jet. The elements in the air system are also protected by a suitable relief valve 60 secured to and movable with the upper movable end of the servo-motor 11. The air pipe 53 has a flexible portion connected to the bellows so that it may easily move with the servo-motor.

*Shifting of multi-load range indicating mechanism and establishment of zero positions thereof for respective ranges.*—As previously mentioned the dial 1 has two sets of graduations 2 and 2' angularly offset with respect to each other, equal spacing of the graduations on the respective sets representing different unit load values which are proportionately related to the force elongation characteristics of the two sets of load weighing springs 28 and 16, 17. The two sets of dial graduations have their own zero positions angularly offset from each other in the manner shown in Fig. 1. To permit the respective sets of graduations to be selectively visible, a mask 3 is provided with a series of slots 89 through which the unit graduations of either set of load ranges may be selectively observed merely by effecting relative angular movement between the dial and mask. The mask and dial are arranged so that the dial may be rotated relative to the mask and vice versa. To effect mask rotation and also to coordinate it with changes in the weighing system from one load range to the other, I provide shifting valve 52, Fig. 4, having a lever 68 connected by a flexible wire 69 to an operating mask lever 70. The wire 69 is contained within a flexible housing 71 secured at 72 to the backing plate 15a while the other end of the cable is secured at 73 to the rear side of the dial 1. The flexible housing 71 preferably extends above and then turns downwardly at 74 for connection to support 73 thereby allowing effective rotation of the upper end 74 of housing 71 with the dial. Mask lever 70 is pivotally connected to plate 15a by a pin and slot connection 75, while the outer end of said lever is pivotally connected at 76 to the rear side of mask 3 through a suitable bracket 77 mounted thereon. The bracket 77 extends through a suitable elongated opening 78 of the dial plate. Two different relative positions between the mask and disc are provided by a detent device having a roller arm 79 pivotally connected at one end to bracket 77 and its other end has a detent roller receivable in one or the other of two V-notches 80 and 81 formed in a plate secured to the back of the dial and movable therewith. A spring 82, secured at one of its ends to the dial 1 and at its other end to roller arm 79, insures a positive relative positioning of the dial and mask.

When the shifting valve 52 is rotated from one position to the other, lever 68 will cause wire 69 to move lever 70 about its relatively fixed pivot 75 thereby causing pivot 76 to move bracket 77 and the mask 3 attached thereto. The roller detent will be received in either one of the V-notches 80 or 81 so as to relatively position the dial and mask.

*Zero positions.*—To permit a continuous testing operation from one load range to the other without interrupting the application of load to the test, I have provided an improved combination whereby the correct zero position for each set of load dial graduations is established before the test starts. This is accomplished by setting the load weighing mechanism on the high load range under control of Bourdon tube 21, Fig. 3, and then, without any load on the testing machine, rotating dial 1 by a knob 84 on the front of the machine. This knob operates a series of gears 85, journalled in backing plate 15a, to move a gear rack 86 secured to the back of the dial. The dial is then rotated until its high load range zero position 87 is in alignment with the load indicating pointer 4. The shifting valve 52 is then adjusted to place the load weighing mechanism on the low load range which is under the control of Bourdon tube 31, Fig. 3. As before mentioned, the rotation of valve 52 causes valve lever 68, Fig. 4, to shift the mask 3. Thereupon the zero position 88 of the low load range will appear in the mask opening 89. Instead of now shifting the dial to bring the zero position 88 in alignment with the load hand 4, the dial remains stationary and the load hand is moved until it is brought into alignment with the zero graduation 88. This adjustment is effected by varying the position of the jet-baffle control 44', 45', Fig. 3. To do this, the jet 45' is supported on a flexible plate 90 one end of which is secured to a fixed bracket 91 projecting outwardly from the back of housing plate 15a. This flexible plate is biased downwardly by a spring 92 while the free end of the plate rests upon a small pointed rod 93 whose lower end is vertically guided in a bracket 94 and actuated by a cam 95. This cam is rotated by a shaft 96 and a roller and gear 97, the roller shaft projecting forwardly through the front panel 98 and provided with a hand knob 98, Fig. 8. By rotating this knob the supporting rod 93 is moved upwardly or downwardly, as the case may be, thereby causing the same relative baffle-jet control action on the servo-motor as exists during expansion or contraction of the Bourdon tube.

Figure 4:
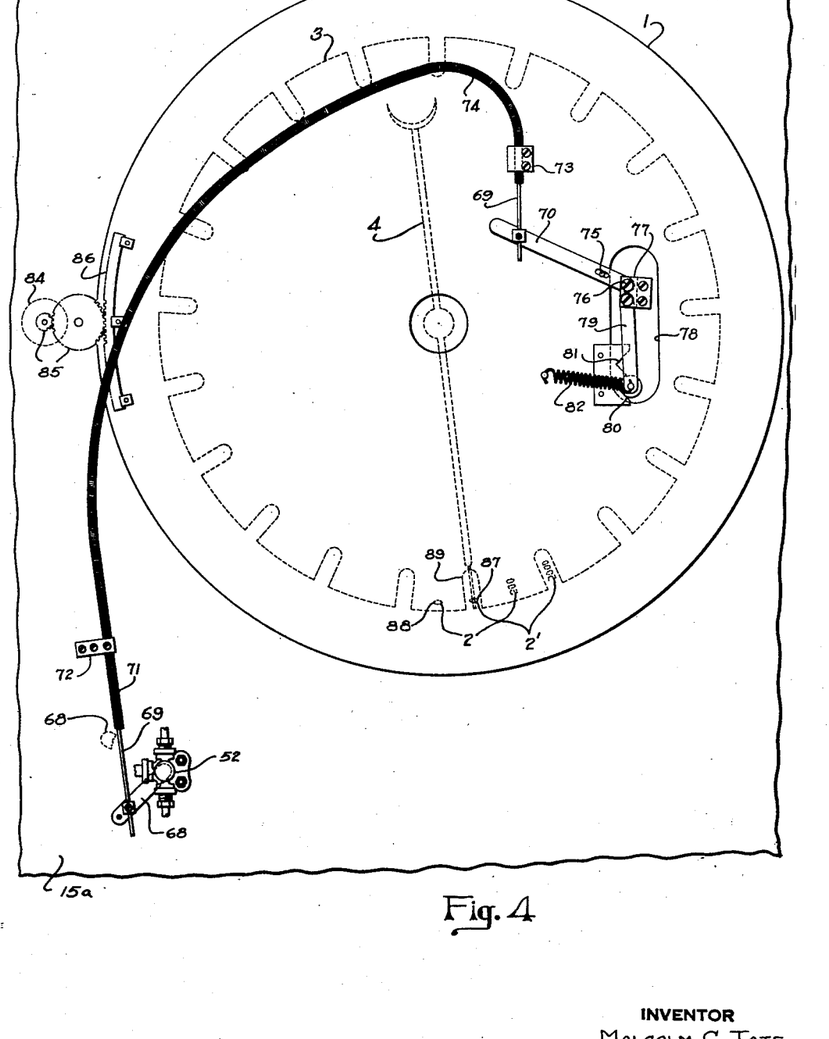
Fig. 4 is a rear view of the indicating dial and the load range adjusting and zero positioning means.

Hence it is possible to manually control the servo-motor and thereby through the rack 7 and pinion 6 adjust the position of the pointer 4 until it is in alignment with the low load range zero position 88, Fig. 4. This adjustment of the load hand does not destroy its relation to the zero position 87 of the high load range when the system is shifted back to the high load range. This is because each load range involves its own pre-established relationship between its jet-baffle, the load hand and the dial. When the system is shifted to the low load range the jet-baffle of the high load range is rendered inoperative and vice versa when the system is shifted to the high load range. Hence it is possible to shift from one load range to the other with complete certainty of having a correct zero position for each range. This permits a test to be started on the low load range with accurate indication of the load values and when the low load range capacity is about used up to then shift to the high load range without interrupting the test and with complete assurance that the high load value indications are correct.

Figures 6, 6A, 6B, 7:
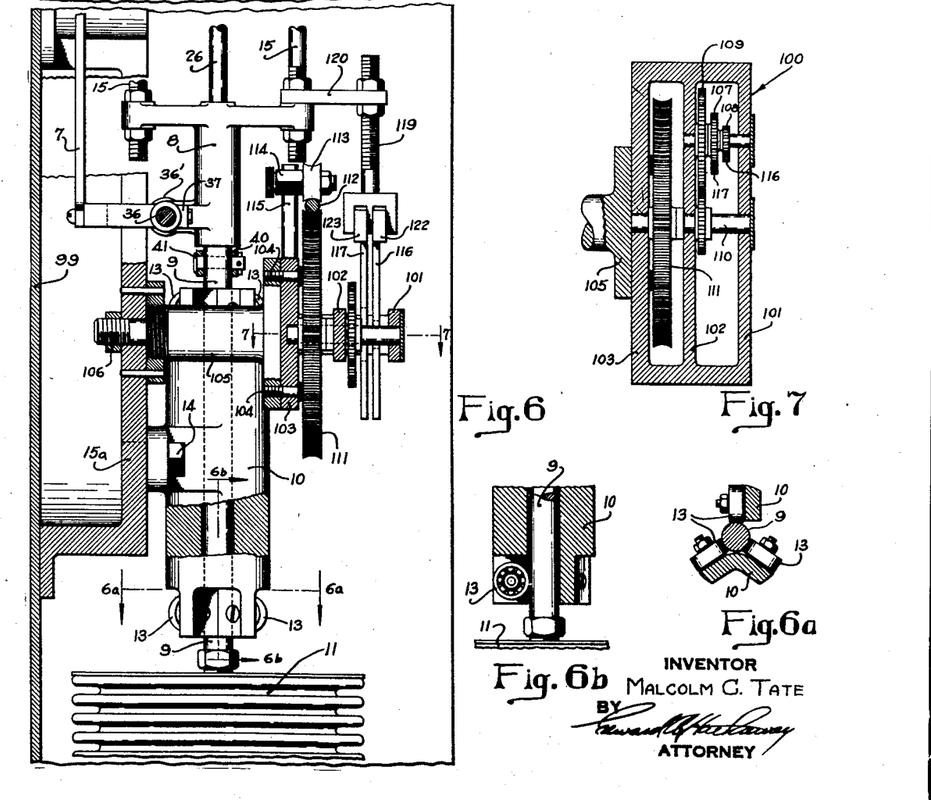
Fig. 6 is an enlarged transverse sectional view of the mechanism taken substantially on the line 6—6 of Fig. 3 whereby the recorder or other extraneous apparatus is operated with various degrees of magnification by the load weighing mechanism.
Fig. 6a is a horizontal section taken on the line 6a—6a of Fig. 6.
Fig. 6b is a vertical section taken substantially on the line 6b—6b of Fig. 6.
Fig. 7 is a horizontal section taken substantially on the line 7—7 of Fig. 6.

*Multiplying mechanism.*—To operate an external device such as the load responsive element of an autographic recorder, I have found that it is especially advantageous to have the rectilinearly movable stylus actuated in proportion to the load and to rotate the usual recorder drum in response to strain of a specimen. Any usual electrically controlled autographic recorder such as shown in Peters Patent 2,081,599 may be employed for this particular purpose. To move the stylus of such a recorder in response to load instead of strain, I provide as shown in Figs. 3, 6 and 7 a gear change mechanism having a stationary frame 100, Fig. 3, formed, as shown in Fig. 6, of front, intermediate and rear walls 101, 102 and 103. The rear wall 103 is fastened by screws 104 to a flanged stud 105 which is secured as at 106 to the backing plate 15a. The stud 105 is offset to one side of the housing 10 through which the servo-motor rod 9 extends. As shown particularly in Fig. 7, the frame 100 has a pair of selectively operable pinions 107 and 108 secured to a common shaft with a gear 109 which, in turn, drives a geared shaft 110. This shaft has a roller gear 111 secured thereto for engaging, Figs. 3 and 6, a screw threaded normally non-rotatable shaft 112 which is held in engagement with the worm gear by a grooved roller 113 suitably journalled on a bracket 114 which is vertically adjustable on a rod 115 projecting upwardly from as an integral part of rear frame wall 103. The threaded shaft 112 has an extension 112' of any desired length extending to the external instrument to be operated. The relative relation between the shaft 112 and worm wheel 111 may be adjusted merely by manually rotating threaded shaft 112 to the desired extent. The pinions 107 and 108 are selectively engaged, Figs. 3 and 6, by a pair of gear racks 116 and 117 each pivotally mounted as at 118 to a bracket vertically adjustably supported on a threaded shaft 119 which is supported in a bracket 120, in turn, mounted on one of the servo-motor operated frame rods 15. Each gear rack has arms 122 and 123 rigidly formed therewith and provided with hooks for selectively engaging a spring 124 whose upper end is mounted upon a suitable arm of bracket 120. The gear racks and arm 120 will, therefore, move vertically with the crosshead and servo-motor thereby causing servo-motor movement to be transmitted to threaded rod 112 and in some multiplied proportion depending which rack 116 or 117 is in mesh with pinions 107 or 108. The threaded shaft 112 and its extension 112' will move rectilinearly in a horizontal plane and it has been discovered that by attaching such a rod to the stylus of the recorder while the recorder drum is rotated in response to strain, it is possible to eliminate very serious difficulties which have heretofore been incident to prior recorder operations wherein the drum was rotated by the servo-motor and the stylus was moved in response to strain. By the present arrangement the multiplying mechanism and stylus respond instantly and faithfully to every pressure change in the jet and orifice system without introducing any lag or inertia effects. Furthermore, the present gear arrangement is extremely simple, readily accessible and conveniently selective in its operation.

From the foregoing disclosure it is seen that I have provided a relatively simple, direct and positive acting control system for the servo-motor as well as providing a very effective multi-load range weighing system which may be co-ordinated with the load indicating mechanism to insure accurate indication for either range as well as to permit a continuous testing operation through one load range into the next one. The apparatus effectively utilizes an inverted type of servo-motor wherein springs 38 and 39 of relatively great length actually rotate the load pointer during increasing loads under decreasing pressure within the servo-motor whereas increasing pressure within the servo-motor may cause the load pointer to indicate decreasing loads. This mode of operation is very effective in conjunction with the simple direct acting jet and orifice control wherein the servo-motor air pressure responds directly to the pressure variations in the jets. All of these features as well as others heretofore mentioned contribute to the high degree of sensitivity, accuracy and responsiveness of the system herein disclosed.

It will of course be understood that various changes in details of construction and arrangement of parts may be made by those skilled in the art without departing from the spirit of the invention as set forth in the appended claims.

I claim:

1. In combination, means movable in response to a change in a given condition, an air controlled power mechanism for causing said movable means to be moved oppositely to said responsive movement, relatively movable air jet and baffle elements one of which is moved with said responsive means, and an air supply passage having an orifice therein communicating at all times during normal operation directly with both said power mechanism and air jet whereby movement of said responsive means causes a variation in jet pressure which is transmitted directly to the power mechanism to cause it to move the responsive means in a contrary direction until a balanced relation exists between the servo-motor and responsive means.

2. The combination set forth in claim 1 further characterized in that extensible means are interposed between said power mechanism and said responsive means whereby the servo-motor has a relatively large increment of movement in response to a small increment of movement of the responsive means.

3. The combination set forth in claim 1 further characterized in that said power mechanism has an expansible motor in which the air pressure decreases with a reduction of jet pressure and vice versa and a spring for moving said motor upon reduction of pressure therein, whereby upon initial separation between said jet and baffle elements the air pressure in said motor decreases so that said spring moves said elements toward each other until a balanced condition is established and upon an initial movement of said elements toward each other the jet pressure increases so that said motor device moves under the influence of the increased pressure to separate said elements until a balanced condition is established.

4. The combination set forth in claim 1 further characterized by the provision of an air chamber connected to said air supply passage at a point between said power mechanism and said orifice.

5. In combination, a plurality of movable condition responsive means operable for different ranges, air controlled power means for actuating a member in proportion to variations in the conditions, means for controlling said power means in accordance with one or the other of said responsive means including an air jet and baffle associated with each of said responsive means, an air supply passage having an orifice, means for selectively connecting one or the other of said jets with said power means, the selected jet and supply passage communicating at all times during normal operation directly with said power means whereby relative movement between the selected jet and its baffle effected by movement of the responsive means therefor causes variations in jet pressure to be transmitted directly to said power means to cause actuation thereof.

6. In combination, a plurality of condition responsive means operable for different ranges, air controlled power means for resisting movement of said responsive means so as to maintain a balanced relation between the forces of said responsive means and said power means, means for selectively controlling said power means by one or the other of said resonsive means including air jets and baffles associated with said responsive means, and an air supply passage having an orifice communicating directly with at least one of said jets and with said power means whereby variations in pressure of one of the jets occasioned by movement of its associated responsive means is transmitted directly to said power means to cause the same to re-establish said balanced relation of forces.

7. The combination set forth in claim 6 further characterized in that said supply passage communicates with a valve from which a plurality of air pipes communicate respectively with said jets, said valve having provision for connecting said air supply pipe selectively with said jet pipes thereby rendering said responsive means selectively operable in accordance with whichever range is desired.

8. In combination, movable condition responsive means, air jet and baffle elements one of which is connected to said movable responsive means and the other of which is supported in a normal fixed position so that relative movement between said elements variably controls the jet pressure in accordance with movement of said responsive means, an air controlled power mechanism for moving said element which is connected to said responsive means so as to maintain a substantially predetermined relation between said elements, and an air supply passage having an orifice therein communicating at all times during normal operation directly with both said power mechanism and air jet whereby movement of said responsive means causes a variation in jet pressure which is transmitted directly to the power mechanism to cause movement thereof until said predetermined relation is established between said air jet and baffle elements.

9. In combination, a pressure responsive element, an air controlled servo-motor controlled by said responsive element to balance the pressure force of said responsive element, yieldable means interposed between said servo-motor and said responsive element and connected to each of the same whereby a relatively large servo-motor movement takes place upon occurrence of an unbalance of the forces between said responsive element and said servo-motor, means forming a surface extending generally in the direction of movement of said servo-motor, and guiding means engaging said surface to prevent rotation of said yieldable means.

10. In combination, movable condition responsive means, an air controlled servo-motor for resisting movement of said responsive means, indicating means actuated by said servo-motor, means including air jet and baffle elements one being normally fixed and the other being associated with said responsive means for movement therewith whereby relative movement between said jet and baffle varies the jet pressure thereby controlling said servo-motor so as to establish a balanced relation between the forces of said servo-motor and said responsive means, and means for relatively adjusting said air jet and baffle elements thereby to establish a predetermined balance of forces between said responsive means and servo-motor for creating a given initial position of said servo-motor and indicating means.

11. The combination set forth in claim 10 further characterized in that said adjustable means includes a flexible plate upon which one of said elements is mounted and a member having a pointed portion engaging said flexible member to effect adjustments thereof.

12. In combination, a plurality of Bourdon tubes respectively adapted for different load ranges, power means for resisting movement of said tubes so as to establish a balanced relation of forces between the power means and tubes, means responsive to changes of pressure in said Bourdon tubes including air jet and baffle elements for each tube and means for selectively connecting one or the other of said jets to said power means for varying the pressure therein thereby to maintain said balanced forces after a change of pressure in the Bourdon tube which corresponds to the selected jet, and means whereby one of said Bourdon tubes is adapted upon completion of its load range to be converted from a cantilever into a two point supported beam thereby to limit the stresses set up in said tube while the other tube remains operative under higher pressures during its load range.

13. In combination, a plurality of Bourdon tubes selectively operable for high and low load ranges, an air operated servo-motor for resisting movement of said Bourdon tubes to maintain a substantially balanced relation between the forces of the servo-motor and Bourdon tubes, air jet and baffle elements associated with each of said tubes, means for rendering said tubes selectively operative to control pressure of said servo-motor and thereby to maintain said balanced forces upon occurrence of a change of pressure in the selected tube, and means whereby the high load range jet and baffle elements are adapted to be maintained in an operative relation to each other upon occurrence of a sudden decrease of load in the high load range tube.

14. The combination set forth in claim 13 further characterized in that said means for maintaining the high load range air jet and baffle operative upon decreases of load comprises a stop for limiting relative movement between the jet and baffle toward each other.

15. In combination, a multi-load range weighing mechanism, a multi-load range indicating mechanism having an indicating element common to each load range, said indicating element having one zero position for one load range and another zero position for another load range, means for shifting the indicating mechanism from one load range to another and holding the same in its shifted position, and means for relatively adjusting said indicating and load weighing mechanisms so as to establish correct zero positions for each of the load ranges before a load weighing operation is started whereby in shifting from one load range to the other the indicating mechanism will have a correct zero position as a base.

16. In combination, a multi-load range weighing mechanism, a multi-load range indicating mechanism having an indicating element common to each load range, said indicating element having one zero position for one load range and another zero position for another load range, means for relatively adjusting said indicating and load weighing mechanisms so as to establish correct zero positions for each of the load ranges before a load weighing operation is started whereby in shifting from one load range to the other the indicating mechanism will have a correct zero position as a base, and means for shifting the load range of one of said mechanisms and automatically shifting the other mechanism so that it has a corresponding load range.

17. In combination, load responsive means, an air operated servo-motor for resisting movement of said responsive means thereby to maintain a balanced relation of forces between the servo-motor and responsive means, means for controlling said servo-motor in accordance with movement of said responsive means, and means for transmitting movement from said servo-motor to an external source including a chain of gears having a worm wheel and a threaded rod engageable therewith, said rod being rectilinearly movable substantially tangentially to the worm wheel.

18. In combination, load responsive means, an air operated servo-motor for resisting movement of said responsive means thereby to maintain a balanced relation of forces between the servo-motor and responsive means, means for controlling said servo-motor in accordance with movement of said responsive means, and means for transmitting movement from said servo-motor to an external source including a chain of gears having a pair of pinions of different diameter and a pair of servo-motor operated racks selectively engageable with said pinions.

19. In combination, a multi-load range weighing mechanism, a multi-load range indicating system having a load hand and a graduated dial provided with a plurality of sets of numbered load graduations each beginning with its own zero position, means for rendering the load ranges of the indicating system selectively operable including a mask having a series of openings adapted to uncover the graduations of only one set of graduations or the other, means for adjusting the load hand relative to one of said zero positions when the weighing mechanism is operative for one of its load ranges, and means for angularly moving said dial to adjust the same relative to the load hand for establishing the zero relation when the weighing mechanism is operative for the other of its load ranges.

20. In combination, a multi-load range weighing mechanism, a multi-load range indicating system having a rotatable indicating element, means for rendering the load ranges of the indicating system selectively operable including a load graduated dial having a plurality of sets of numbered load graduations and a mask having a series of openings adapted to uncover the graduations of only one set of graduations or the other, means for angularly moving said dial to adjust the same relative to said mask to effect a predetermined positioning of said indicating element relative to the mask openings in accordance with the load range at which it is desired to operate the weighing mechanism, and means for also rotating said indicating element to effect a predetermined relation between the indicating system and the load graduations.

21. In combination, a multi-load range weighing system, a multi-load range indicating system having a dial provided with a plurality of sets of load range graduations angularly offset with respect to each other and each load range having its own zero graduation, a load indicating pointer actuated by said weighing system, means for adjusting the zero position of one load range by adjusting one range of the load weighing mechanism whereby the pointer is adjusted to its zero graduation, and means for adjusting the zero position of the other range of the indicating system by moving the dial relative to the pointer.

22. In combination, a multi-load range indicating system having a dial provided with a plurality of sets of load range graduations each having its own zero graduation offset from each other, a load indicating member, a mask for covering one set or the other of said graduations, means operatively connected to said dial for shifting the mask relative thereto to render said sets of graduations selectively operative, and means for moving the dial and mask together as a unit with said operative connection for establishing a zero position of one of said sets of graduations.

23. The combination set forth in claim 22 further characterized by the provision of a multi-load weighing system, means for changing the load range of said weighing system, and means for connecting said load changing means with said mask shifting means including a flexible connection between the mask shifting means and the range changing means of the weighing system.

24. In combination, a Bourdon tube, an air operated servo-motor having a movable portion, an air jet and baffle controlled by said tube for controlling air pressure in said servo-motor, a rod and extensible means interposed between and connected to said servo-motor and said Bourdon tube, and a relatively stationary bracket having at least three radially disposed roller bearings for engaging and axially guiding said rod.

25. In combination, a plurality of condition responsive means respectively adapted for different ranges of operation, a plurality of sets of springs of different degrees of flexibility, each of said responsive means respectively having connection with said sets of springs, air controlled power means common to said plurality of setof springs and operative to resist movement of said responsive means, said power means acting simultaneously on all of said sets of springs during each range of operation, a multi-range indicating mechanism operated by said power means, and means for adjusting the zero relation between the weighing mechanism and indicating means for each of said ranges.

26. In combination, a plurality of pressure responsive tubes operable for different ranges, a plurality of sets of springs of different degrees of flexibility, one set being for one of said responsive means and another set for another of said responsive means, power means common to said plurality of sets of springs and operative to resist movement of said tubes, jet and baffle elements associated with each of said tubes so as to be respectively operated by the same, said power means acting simultaneously on all of said sets of springs during each range of operation, a multi-load range indicating mechanism operated by said power means, and means for adjusting a zero relation between the weighing mechanism and indicating means including means for relatively adjusting said jet-baffle elements thereby to operate said servo-motor and cause the indicating mechanism to be adjusted until the zero position is obtained.

27. In combination, a mechanism having a plurality of condition responsive means respectively adapted for different ranges of operation, a plurality of sets of springs connected respectively to said plurality of responsive means, air controlled power means common to said plurality of sets of springs and respectively operative to resist movement of said plurality of said responsive means respectively; a device operated by said power means; and shifting means for rendering said power means responsive to one or another of said condition responsive means while maintaining said mechanism continuously subject to the responsive condition.

28. In combination, load responsive means, and means for transmitting movement in accordance with said load responsive means including a rotatable worm wheel and a screw threaded rod tangentially engageable therewith so as to be moved axially upon rotation of said worm wheel and said threaded rod being axially adjustable by rotating the rod thereby to move the same tangentially relative to the worm wheel and bring rod threads into engagement with different worm gear teeth.

MALCOLM C. TATE.